R. J. HAYNES.
CANE STRIPPER.
APPLICATION FILED NOV. 28, 1917.
1,264,791.
Patented Apr. 30, 1918.
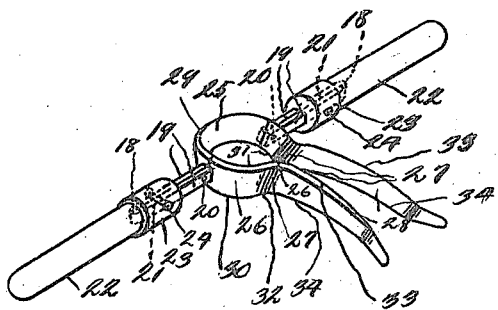
Witnesses
Inventor
R. J. Haynes
By
Attorneys

UNITED STATES PATENT OFFICE.

ROBERT J. HAYNES, OF RAZOR, TEXAS.

CANE-STRIPPER.

1,264,791.  Specification of Letters Patent.  Patented Apr. 30, 1918.

Application filed November 28, 1917. Serial No. 204,394.

*To all whom it may concern:*

Be it known that I, ROBERT J. HAYNES, a citizen of the United States, residing at Razor, in the county of Lamar, State of Texas, have invented a new and useful Cane-Stripper; and I do hereby declare the following to be a full, clear, and exact description of the invention, such as will enable others skilled in the art to which it appertains to make and use the same.

This invention relates to an improved cane stripper, and one of the objects of the invention is to provide an improved device of this kind, which is simple, efficient and practical in construction, and may be manufactured at a small cost and sold at a reasonable profit.

A further object of the invention is to provide an improved stripper comprising a handle having opposing yieldable cane stripping blades, which are provided with opposite semi-circular parts having cutting edges, whereby, as the device is moved downwardly on the stalk or cane, the cutting edges of the semi-circular curved portions will act to strip the leaves from the cane or stalk.

A further object of the invention is the provision of an improved device of this kind provided with opposing spring jaws arranged substantially V-shaped, whereby the cane or stalk may pass therebetween into engagement with the semi-circular portion.

A further object of the invention is the provision of an improved cane stripper having double cutting edges on its blades, whereby, as a twist is imparted to the device, said cutting edges may act to top the cane or stalk.

A further object of the invention is to provide an improved cane stripper having opposing axially alined handles extending from the circular portion of the stripper, whereby a straight downward movement may be imparted to the stripper, and whereby the device may be held substantially even during such movement.

In practical fields the details of construction may necessitate alterations falling within the scope of what is claimed.

The invention comprises further features and combination of parts as hereinafter set forth shown in the drawings and claimed.

In the drawing a single figure is shown illustrating the improved cane stripper.

Referring more especially to the drawings the blades of the cane stripper are constructed of a single strip of spring steel, which is bent at 18 to form the parallel adjacent portions 19, which are riveted together as shown at 20. These adjacent parallel portions 19 form shanks which are fitted into the sockets 21 of the handles 22. Ferrules or thimble members 23 are fitted to the handles 22 (which are constructed of wood) to prevent the handles from splitting, there being pins 24 passing through the thimbles and the handles and through the shanks to hold said parts together. The portions 19 of the shanks nearest the body of the operator merge integrally into the semi-circular portion 25, while the portions 19 farthest from the body of the operator merge into the curved parts 26, which in turn are bent at 27 and merge into the spring jaws 28, between which a substantially V-shaped opening similar to 15 is provided, whereby the cane or stalks may pass therethrough and into engagement with the circular portion formed by the curved parts 25 and 26. It is to be noted that the curved portions 25 and 26 and the spring jaws 28 have upper and lower cutting edges 29 and 30, 31 and 32, and 33 and 34. By these cutting edges either side of the cane stripper may be employed. The circular opening of the cane stripper tapers and when using the cane stripper a downward pressure is imparted on both handles 22 at once, and the cane stripper will move in a plane substantially horizontally. When moving the cane stripper downwardly the handles 22 may be operated in order to spring the curved portion 25, whereby the jaws 28 may be further separated or additionally brought toward each other as the case may require.

The invention having been set forth what is claimed as new and useful is:—

1. In a cane stripper, a cutting body constructed from a single length of spring steel bent to form opposing parallel parts arranged in pairs, the parts of one pair being adjacent each other and constituting a shank, means for securing the parts of the shank together, handles secured on said shanks, the corresponding parts of the shank merging into a semi-circular curved portion, other corresponding parts of the shank merging into quarterly curved parts, which terminate in outwardly extending spring jaws arranged V-shaped with relation to each other, said shanks and their handles being arranged diametrically opposite each other and axially alined, whereby the operator may operate the handles to spring the semicircular portion and separate the jaws.

2. In a cane stripper, a cutting body, said body being formed from a single length of spring steel, said body having a substantially circular part having an open portion, the opposite parts of said open portion having laterally extending spring jaws arranged V-shaped with relation to each other, said spring jaws having cutting edges and having their terminals bent outwardly, whereby a stalk may be guided between the jaws and thence into the circular portion, said circular portion having diametrically opposed shanks arranged axially and extending laterally and at right angles to the spring jaws, and handles carried by said shanks, whereby the operator may spring the circular portion and spread the jaws toward and from each other to admit of the stalk into the circular portion and to regulate the degree of cutting by the cutting edge of the circular portion, the upper and lower edges of the circular portion having cutting edges, which merge into the cutting edges of the jaws.

In testimony whereof I have signed my name to this specification in the presence of two subscribing witnesses.

ROBERT J. HAYNES.

Witnesses:
M. B. PARK,
G. L. WEBSTER.

Copies of this patent may be obtained for five cents each, by addressing the "Commissioner of Patents, Washington, D. C."